United States Patent [19]

Germain

[11] 4,122,968
[45] Oct. 31, 1978

[54] VAPOR RECOVERY FILLER NECK ASSEMBLY

[75] Inventor: Lee A. Germain, Tallmadge, Ohio

[73] Assignee: The Goodyear Tire & Rubber Company, Akron, Ohio

[21] Appl. No.: 858,922

[22] Filed: Dec. 9, 1977

Related U.S. Application Data

[63] Continuation of Ser. No. 740,504, Nov. 10, 1976, abandoned.

[51] Int. Cl.² ............................................. B65B 3/18
[52] U.S. Cl. .................................. 220/86 R; 138/114; 141/285
[58] Field of Search ............................. 138/111–117, 138/122; 141/54, 56, 59, 285, 290, 310, 392; 220/85 VR, 85 VS, 86 R; 285/133 R

[56] References Cited

U.S. PATENT DOCUMENTS

| 3,187,936 | 6/1965 | Downing | 138/114 X |
| 3,369,695 | 2/1968 | Johnson | 220/86 R |

*Primary Examiner*—Richard E. Aegerter
*Assistant Examiner*—Frederick R. Schmidt
*Attorney, Agent, or Firm*—L. A. Germain

[57] ABSTRACT

A filler neck for mounting between a fueling port and a fuel tank entry nipple provides a fuel path into the tank and a vapor recovery path from the tank while being serviced from a fuel dispensing nozzle having vapor recovery means. The filler neck comprises a fuel delivery tube having a plurality of ribs on its outside surface and connected into the inside of the tank entry nipple. A sleeve tube is slipped over the fuel delivery tube and is connected at one end to the fueling port and at the other end to the outside of the tank entry nipple. The relationship between the tubes and the tank entry nipple is such that a vapor path exists in the valleys defined by the ribs on the fuel delivery tube.

15 Claims, 5 Drawing Figures

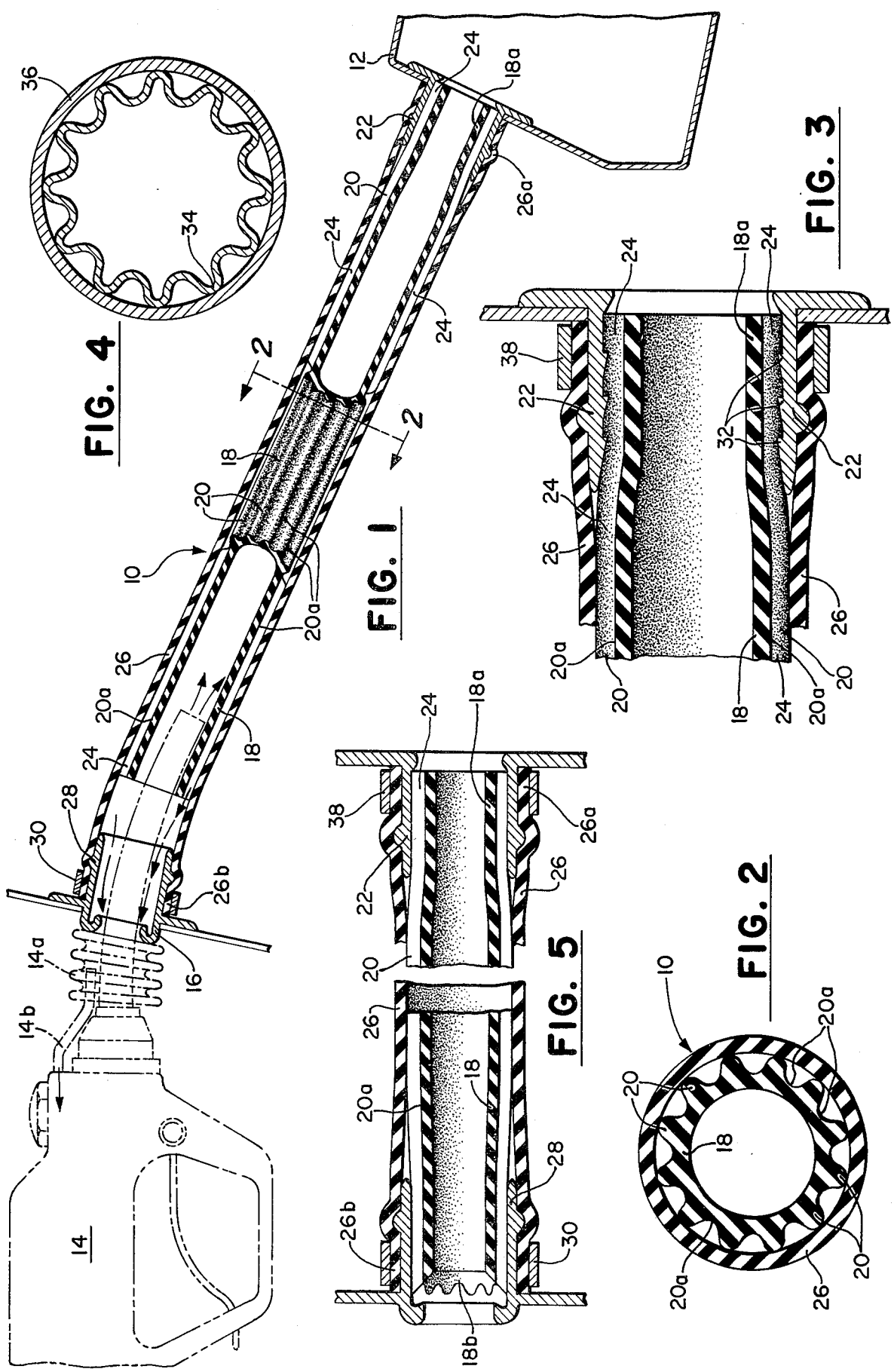

VAPOR RECOVERY FILLER NECK ASSEMBLY

This is a continuation of application Ser. No. 740,504 filed Nov. 10, 1976, now abandoned.

BACKGROUND OF THE INVENTION

This invention generally relates to fuel vapor recovery systems and more particularly to a filler neck assembly that provides a vent path for fuel vapor from the tank being filled to a vapor recovery, fuel dispensing nozzle.

In the activity of refueling tanks, whether vehicle or stationary types, fuel loss in the form of vapor is of increasing concern, not only because of its polluting affect and obvious hazard but also because of the waste. In this circumstance, manufacturers have concentrated efforts in the development of vapor recovery pumps and nozzles and various type fill pipe venting arrangements that are connected between the tank being serviced and the entry port accepting the fuel delivery nozzle. The venting arrangements connected between the nozzle entry port and the fuel tank have taken on a characteristic form, i.e., a filler neck pipe and a vent tube that is either external or internal with respect to the filler neck. In the case of an external vent tube, multiple connections are required at the entry port and at the tank and obviously this arrangement increases the cost and also makes the vent tube vulnerable to being damaged. In the case of an internal tube, the tube is subject to being blocked by the rising fuel in the tank while also increasing the manufacturing costs by reason of the manner in which the tube is mounted in the filler neck pipe.

It is therefore an object of this invention to provide a filler neck assembly that simplifies installation between the nozzle entry port and the fuel tank, provides a vapor recovery path for venting fuel vapors from the tank while being serviced, and provides a filler neck capable of withstanding impacts while maintaining its closure integrity.

These objects and advantages will become evident from the description that follows when considered in conjunction with the accompanying drawings in the several figures in which like parts bear like reference numerals.

BRIEF DESCRIPTION OF THE DRAWING

FIG. 1 is a sectional side view illustrating the invention in conjunction with a fuel delivery nozzle and a fuel tank, the nozzle being illustrated in ghost lines;

FIG. 2 is a sectional view taken on lines 2—2 of FIG. 1;

FIG. 3 is a sectional side elevational view showing the connection of the filler neck to the fuel tank entry nipple;

FIG. 4 is a sectional view similar to that of FIG. 2 illustrating another embodiment of the invention, and FIG. 5 is a sectional side elevational view illustrating an embodiment wherein the filler neck tubes are connected at one end to the fueling port and at the other end to the tank.

DESCRIPTION OF THE INVENTION

Referring to the drawing, a filler neck assembly is generally indicated by reference numeral 10. As illustrated, the filler neck 10 provides fuel entry into a reservoir or tank 12 being fed or serviced from a fuel delivery nozzle 14, the nozzle being indicated in ghost lines. The nozzle 14 may be any one of a number of recently developed nozzles adapted for drawing off the fuel vapor vented from the tank 12 in the process of refueling. The nozzle generally comprises a seal 14a for closing off the fill pipe entry port 16 and a type venting arrangement 14b for drawing the vapor back into the supply tank (not shown).

Now therefore, the instant invention provides a filler neck assembly 10 for venting the fuel vapor generated in the tank 12 in the refueling process, back to the nozzle 14 for return to the supply. The filler neck comprises a fuel delivery tube 18 that is characterized by a plurality or ribs 20 on its outside surface. The ribs 20 may either be longitudinal or spiralled depending on the strength and bending requirements of the tube as will be more fully understood hereinafter as the description proceeds. To continue, the fuel delivery tube 18 has one of its ends 18a connected into the tank inlet nipple 22 more clearly illustrated in FIG. 3. Because of its relationship with the tank inlet nipple, i.e., being on the inside rather than on the outside as is customary, the ribs 20 formed on the fuel delivery tube are instrumental in providing a vent path 24 for fuel vapor from the tank.

To accomplish venting of the vapor from the tank 12, a second tube 26 is slipped over the fuel delivery tube 18 in a coaxial relationship therewith such that the valleys 20a formed on the outside of the delivery tube by reason of the ribs 20, creates a plurality of vent passages 24 between the two tubes. The second tube or sleeve 26 is connected at one of its ends 26a to the outside of the tank inlet nipple 22 in the customary fashion as illustrated in FIG. 3, thus maintaining the vent path 24 created by virtue of the rib-inlet interface. The fuel vapor from the tank enters the valley areas 20a formed by the ribs to be drawn up between the two tubes. The sleeve tube 26 has its opposite end 26b connected to an entry port nipple 28 by any one of various means, as for example a clamp 30.

In the application of the filler neck assembly 10 to vehicular use, it is contemplated that the fuel delivery tube 18 will be an acrylonitrile-butadiene hose that will not be affected by the hydrocarbon fuel being fed into the tank 12. In this circumstance, the fuel delivery hose 18 may be tightly fit into the tank inlet nipple 22 and secured there by the frictional force of the elastomer against the walls of the nipple. However, it may be desirous to strengthen the connection by providing annular inwardly facing ribs 32 on the inside surface of the nipple to engage the outwardly facing ribs 20 formed on the hose 18. Since the opposite end 18b of the fuel delivery hose is not connected, no severe forces are exerted on it to dislodge it from the nipple. It is further contemplated, in the vehicular application, that the sleeve tube 26 will comprise a polychloroprene (neoprene) hose that will not be affected by ozone deterioration. The two hoses may be made in long lengths and later cut to the desired length for a specific application. As herebefore mentioned, the ribs on the outside surface of the fuel delivery hose 18 may be longitudinal or spiralled. In an application where greater support is required of the hose, longitudinal ribs will provide a degree of longitudinal support strength while also providing a vent path for fuel vapor. By the same token, in applications where a more flexible filler neck is required, the spiralled ribs will aid in flex bending of the hose while still retaining the vent capability of the filler neck assembly.

In the application of the invention to stationary tanks, as for example bulk storage tanks, the filler neck assembly 10 may comprise metal tubes 34, 36 as illustrated in FIG. 4. In this respect, the inner fuel delivery tube 34 will comprise a drawn metal corrugated pipe while the outer or sleeve tube 36 will be cylindrical. The tank inlet nipple connections are similar to those illustrated in FIG. 3 while the nozzle inlet port may or may not be connected to a support since the metal structure is sufficiently rigid to be free standing.

It will be appreciated by those skilled in the art that the fuel delivery and sleeve tubes may comprise any combination of materials. For example, in the vehicle application described above, the inner fuel delivery tube 18 may comprise an elastomeric hose while the sleeve tube 26 may be of metal for a more rigid installation. The opposite is also contemplated wherein the inner fuel delivery tube 34 may comprise a corrugated metal pipe while the outer sleeve tube 36 may be an elastomeric hose. In this respect, "elastomeric" implies any suitable rubber or plastic material. It is further contemplated that, with modifications to the nipple connections, the inner surface of the sleeve tube may be ribbed or corrugated while the outer surface of the fuel delivery tube is smooth.

Now therefore, it should be appreciated that certain advantages accrue to the instant invention that are not found in the prior art. For example, because the two tubes are in a telescoping relationship, frontal or lateral impact forces on the assembly or on the surrounding structure will cause the tubes to telescope together or apart thus absorbing some of the impact energy. In this circumstance and upon an impact moving the tubes apart, the sleeve tube may move the full length of the tank entry nipple before the closure integrity of the filler neck is lost. Furthermore, since the fuel delivery tube is connected but at one end 18a to the tank, it will remain intact on the tank except in the most extreme cases where even the tank is destroyed. It should also be appreciated that the sleeve tube offers a protective cover for the fuel delivery tube, which cover protection is increased in thickness by virtue of the rib thickness on the fuel delivery tube. Thus the assembly offers increased puncture resistance over that provided by a single walled structure.

In some installations, it may be beneficial or even required that the sleeve tube be clamped to the fuel tank inlet and the fuel delivery tube be connected into the fueling port. In this circumstance, FIG. 5 illustrates such an installation wherein a hose clamp 38 secures the sleeve tube end 26a to the tank inlet nipple while the opposite end 26b is secured to the fueling port via clamp 30. Further, the fuel delivery tube 18 has its end 18b connected into the fueling port in the same manner as the end 18a is connected into the tank inlet nipple. Accordingly, and since the fuel delivery tube requires only a force fit into the nipple bore, the telescoping relationship between the tubes is maintained.

While certain representative embodiments and details have been shown for the purpose of illustrating the invention, it will be apparent to those skilled in this art that various changes and modifications may be made therein without departing from the spirit or scope of the invention.

I claim:

1. A filler neck mounted between an entry fueling port and a fuel tank inlet nipple to provide fuel entry into the tank and recovery of fuel vapor from the tank while being serviced from a fuel dispensing nozzle having vapor recovery means, said filler neck comprising:
   (A) a fuel delivery tube having a plurality of substantially longitudinal ribs extending the full length of its outside surface, said tube having one of its ends connected into the tank inlet nipple such that the ribs engage the inside of the nipple while the opposite end is left unconnected but the length of the tube toward the fueling port is sufficient for receiving the dispensing nozzle therein: and
   (B) a sleeve tube mounted over and coaxial with the fuel delivery tube and having one of its ends connected over the outside of the tank inlet nipple while the opposite end is connected to the fueling port, the relationship of the two tubes being such that a vapor path exists between the tubes in the valleys defined by the ribs and upon receiving an impact force at the fueling port connection the sleeve tube may move telescopically relative to the fuel delivery tube.

2. The filler neck as set forth in claim 1 wherein the tubes are elastomeric hoses.

3. The filler neck as set forth in claim 2 wherein the fuel delivery tube comprises nitrile rubber and the sleeve tube comprises neoprene rubber.

4. The filler neck as set forth in claim 2 wherein the tubes are plastic.

5. The filler neck as set forth in claim 1, wherein the ribs are spiralled along the length of the fuel delivery tube.

6. The filler neck as set forth in claim 1 wherein the tubes are metal.

7. The filler neck as set forth in claim 6 wherein the fuel delivery tube is corrugated to form peaks and valleys such that the vapor path exists in the valleys.

8. The filler neck as set forth in claim 1 wherein the fuel delivery tube is a drawn corrugated metal tube and the sleeve tube is an elastomeric hose.

9. The filler neck as set forth in claim 1 wherein the fuel delivery tube is an elastomeric hose and the sleeve tube is metal.

10. In combination with an automotive fuel tank and a fueling port mounted on the vehicle, a filler neck assembly interconnecting the fueling port and an inlet nipple on the tank for service delivery of fuel to the tank from a fuel dispensing nozzle having vapor recovery means, said filler neck assembly comprising:
   (A) a fuel delivery tube having a plurality of substantially longitudinal ribs extending the full length of its outside surface, said tube having one of its ends connected into the fuel tank inlet nipple such that the ribs engage the inside of the nipple while the opposite end toward the fueling port is unconnected but the length of the tube is sufficient for receiving the dispensing nozzle therein; and
   (B) a sleeve tube encircling the fuel delivery tube in a coaxial relationship and having one of its ends connected to the outside of the tank inlet nipple and the opposite end connected to the fueling port, the relationship of the tubes being such that a vapor path exists between the tubes in the valleys defined by the ribs from the tank inlet to the fueling port and upon receiving an impact force at the fueling port connection the sleeve tube may move telescopically relative to the fuel delivery tube.

11. The filler neck assembly as set forth in claim 10 wherein the fuel delivery tube is also connected into the inside of the fueling port by engagement of the ribs.

12. The filler neck assembly as set forth in claim 11 wherein the tubes are elastomeric hoses, the fuel delivery hose comprising acrylonitrile-butadiene rubber and the sleeve hose comprising polychloroprene rubber.

13. The filler neck as set forth in claim 11 wherein the fuel delivery tube is an elastomeric hose and the sleeve tube is metal.

14. The filler neck as set forth in claim 11 wherein the fuel delivery tube is a corrugated metal tube and the sleeve tube is an extruded elastomeric hose.

15. The filler neck as set forth in claim 11 wherein the fuel delivery tube is a corrugated metal tube and the sleeve tube is a cylindrical metal tube.

* * * * *